(12) United States Patent
Spertus et al.

(10) Patent No.: US 7,725,882 B1
(45) Date of Patent: May 25, 2010

(54) SYSTEM AND METHOD FOR PROFILING PROCESSES IN A COMPUTING SYSTEM

(75) Inventors: Michael P. Spertus, Chicago, IL (US); Christopher D. Metcalf, Wellesley, MA (US); Gadi Wolfman, Herzliya (IL)

(73) Assignee: Symantec Operating Corporation, Mountain View, CA (US)

( * ) Notice: Subject to any disclaimer, the term of this patent is extended or adjusted under 35 U.S.C. 154(b) by 1272 days.

(21) Appl. No.: 11/240,232

(22) Filed: Sep. 30, 2005

(51) Int. Cl.
*G06F 9/44* (2006.01)
(52) U.S. Cl. .................................... 717/130
(58) Field of Classification Search ............. None
See application file for complete search history.

(56) References Cited

U.S. PATENT DOCUMENTS

| | | | |
|---|---|---|---|
| 5,455,949 | A | 10/1995 | Conder et al. |
| 6,728,955 | B1 | 4/2004 | Berry et al. |
| 6,779,187 | B1 | 8/2004 | Hammond |
| 7,003,765 | B1 | 2/2006 | Venkatasubramanian et al. |
| 7,007,026 | B2 | 2/2006 | Wilkinson et al. |
| 7,568,196 | B2 * | 7/2009 | Krebs .................... 718/100 |
| 2003/0167421 | A1 * | 9/2003 | Klemm ..................... 714/37 |
| 2006/0265693 | A1 * | 11/2006 | Goldin ................... 717/124 |

OTHER PUBLICATIONS

"Start, stop, pause, resume, or restart a service", Windows Server 2003 documentation, retrieved from http://technet.microsoft.com/en-us/library/cc736564(WS.10,printer).aspx on Sep. 11, 2009.*
"Configure how a service is started", Windows Server 2003 documnetation, retrieved from http://technet.microsoft.com/en-us/library/cc739213(WS.10,printer).aspx on Sep. 11, 2009.*
Mikunov, Aleksander, "Rewrite MSIL Code on the Fly with the .NET Framework Profiling API", MSDN Magazine, Sep. 2003 Issue, pp. 1-9.
Veritas, Veritas Indepth for Microsoft .NET Installation and Administration Guide, Copyright 2005, Mountain View, CA, pp. 1-40.

* cited by examiner

*Primary Examiner*—Wei Y Zhen
*Assistant Examiner*—Philip Wang
(74) *Attorney, Agent, or Firm*—Rory D. Rankin; Meyertons Hood Kivlin Kowert & Goetzel, P.C.

(57) ABSTRACT

A system and method for managing the environment of software processes in a computer system. A computer system comprises a processor and at least one process environment comprising one or more environment variables. The processor executes one or more processes, intercepts the launch of a process, sets at least one environment variable to a first value, and continues the launch of the process. Setting the environment variable may enable a profiler process. The processor may set at least one environment variable for the process to a value which is chosen irrespective of a value of the environment variable of a parent process of the process. Further, the processor may set at least one environment variable for the process to a default value if a data repository does not contain an entry that has an identification which corresponds to the process.

22 Claims, 5 Drawing Sheets

SYSTEM AND METHOD FOR PROFILING PROCESSES IN A COMPUTING SYSTEM

BACKGROUND OF THE INVENTION

1. Field of the Invention

This invention relates to computer processes and, more particularly, to managing the profiling of processes.

2. Description of the Related Art

In order to gain a fuller understanding of the operation of software processes, it is common to employ any of a variety of monitoring, profiling, and/or analysis programs in conjunction with the software processes to be understood. Such monitoring, profiling, and analysis programs which, for simplicity, may collectively be referred to as "profilers", are available from many vendors or may be custom-made for specific applications. It is generally desirable to be able to profile selected processes as well as to select specific profilers to operate with selected processes. Therefore, some mechanism for identifying processes and profilers and associating one with the other may be desired. Existing operating system software may provide environment variables through which profiling and profiling processes may be specified. However, each process may have its own individually set environment variables, the values of which may be determined by the process itself or a parent process from which the profiled process is launched. Since the profiled process and the profiler may be written by different programmers or come from different vendors, the environment variable settings of any given process may not conform to the settings desired by the profiler.

For example, software systems such as Microsoft's .NET® framework and Windows® operating system may enable programs and processes to provide dynamic and interactive web pages such as Active Server Pages (ASP). As applications and processes based on .NET technology proliferate, the desire to monitor and profile the operation of these applications and processes has increased. The .NET framework includes a profiling Application Program Interface (API) which allows application programmers to write an application (e.g., a "profiler") that can monitor the operation of applications running within the .NET framework. Such a profiler may monitor resource usage, interactions between processes and the operating system or the .NET framework, exception handling, etc.

To enable a profiler to monitor a process, the .NET profiling API uses environment variables (sometimes referred to as "envars") that are provided by the underlying operating system. One environment variable, COR_ENABLE_PROFILING may be used to determine whether profiling is enabled. A second environment variable, COR_PROFILER may be used to specify a particular profiler to be used. The values of these environment variables at the time the process is launched determine if and how the process will be profiled. In the case of applications for which the source code is readily available and may be modified, the program may set the environment variables itself. However, in many cases it is difficult to change the environment variables between process launches. For example, a system reboot may be required to have new environment variable settings take effect if the process is a system service. Also, the source code for a given application (e.g., third party applications) may not be available. Consequently, it may not be possible, or practical, to modify an application to set particular environment variables.

Consequently, a method and mechanism for managing the environment variables and the profiling of processes is desired.

SUMMARY OF THE INVENTION

Various embodiments of a system and method are disclosed. In one embodiment, a computer system comprises a processor and at least one process environment comprising one or more environment variables. The processor is configured to execute one or more processes, intercept the launch of a first process, set at least one environment variable of the environment variables to a first value, and continue the launch of the first process.

In a further embodiment, setting the environment variable enables a profiler. In a still further embodiment, the processor is configured to enable profiling in response to detecting that the at least one environment variable has a first value and disable profiling in response to detecting that the at least one environment variable has a second value or is not set.

In a still further embodiment, the processor is configured to set at least one environment variable for the first process to a value which is chosen irrespective of a value of the at least one environment variable of a parent process of the first process. In a still further embodiment, the processor is configured to set at least one environment variable for the first process to a default value, responsive to detecting that the data repository does not contain an entry that has an identification which corresponds to the first process These and other embodiments will become apparent upon reference to the following description and accompanying figures.

Figure 1:
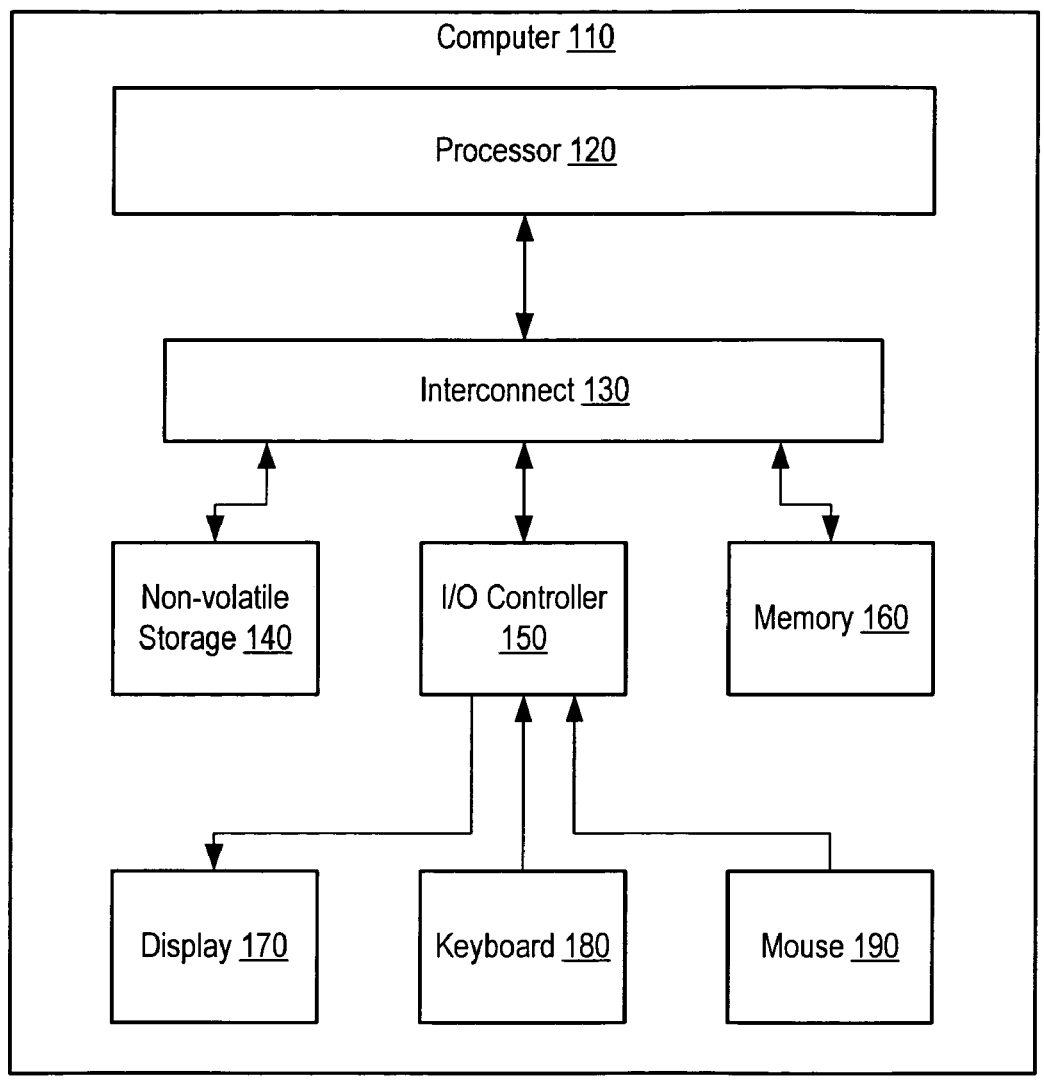
FIG. 1 illustrates one embodiment of a computer including a processor.

While the invention is susceptible to various modifications and alternative forms, specific embodiments are shown by way of example in the drawings and are herein described in detail. It should be understood, however, that drawings and detailed descriptions thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

The following description is presented to enable one of ordinary skill in the art to make and use the invention. Descriptions of specific embodiments and applications are provided only as examples and various modifications will be readily apparent to those skilled in the art. The general principles described herein may be applied to other embodiments and applications without departing from the scope of the invention. Thus, the present invention is not to be limited to the embodiments shown, but is to be accorded the widest scope consistent with the principles and features described herein.

FIG. 1 illustrates one embodiment of a computer 110 including a processor 120. Processor 120 is shown coupled through an interconnect 130 to a non-volatile storage 140, an I/O controller 150, and a memory 160. I/O controller 150 may be coupled to a display 170, a keyboard 180, and a mouse 190. A variety of other peripheral devices such as boot devices and network interfaces may be coupled to I/O controller 150 as well as or instead of those described above. In addition, interconnect 130 may couple a variety of other devices to processor 120 depending on the desired functionality of computer 110.

Processor 120 may be configured to execute instructions and to process data according to a particular instruction set architecture (ISA). In one embodiment, processor 120 may be configured to implement an x86 compatible ISA, although in other embodiments it is contemplated that any desired ISA may be employed, such as the SPARC V9 ISA, PowerPC compatible ISAs, or MIPS compatible ISAs, for example. (SPARC is a registered trademark of Sun Microsystems, Inc.; PowerPC is a registered trademark of International Business Machines Corporation; MIPS is a registered trademark of MIPS Computer Systems, Inc.).

In various embodiments, memory 160 may comprise any suitable type of system memory as described above, such as FB-DIMM, DDR/DDR2 SDRAM, or RDRAM®, for example. Memory 160 may include multiple discrete banks of memory. Also, in some embodiments memory 160 may include multiple different types of memory.

In some embodiments, computer 110 may include more than one instance of the devices shown, such as more than one processor 120, for example. In various embodiments, computer 110 may be configured as a rack-mountable server system, a standalone system, or in any other suitable form factor. In some embodiments, computer 110 may be configured as a client system rather than a server system.

In one embodiment, processor 120 may be configured to run operating system software such as Microsoft Windows, IBM AIX or Sun Microsystems Solaris. Operating system software may in turn provide an environment in which processor 120 may execute additional software modules in the form of applications, programs, or processes designed to perform specific functions. Running operating system software or software modules may comprise executing instructions that are stored in memory 160.

Software modules that may be executed by processor 120 may include, in one embodiment, client/server software such as a web server or a web browser. Alternatively, or in addition, processor 120 may execute software modules comprising network management software, office productivity tools, e-mail programs, etc. Many other types of software may be executed such as a virtual machine runtime environment, a database, an application server, and diagnostic, monitoring, profiling, or analysis software. Furthermore, while executing such software, processor 120 may retrieve data from and store data in non-volatile storage 140 or in memory 160. In one embodiment, one or more software processes may perform the function of profiling other software processes during operation, gathering and storing data indicative of the operation of one or more of the other software processes. Alternatively, profiling of a process may be achieved by linking a profiling library into the target process itself.

Figure 2:
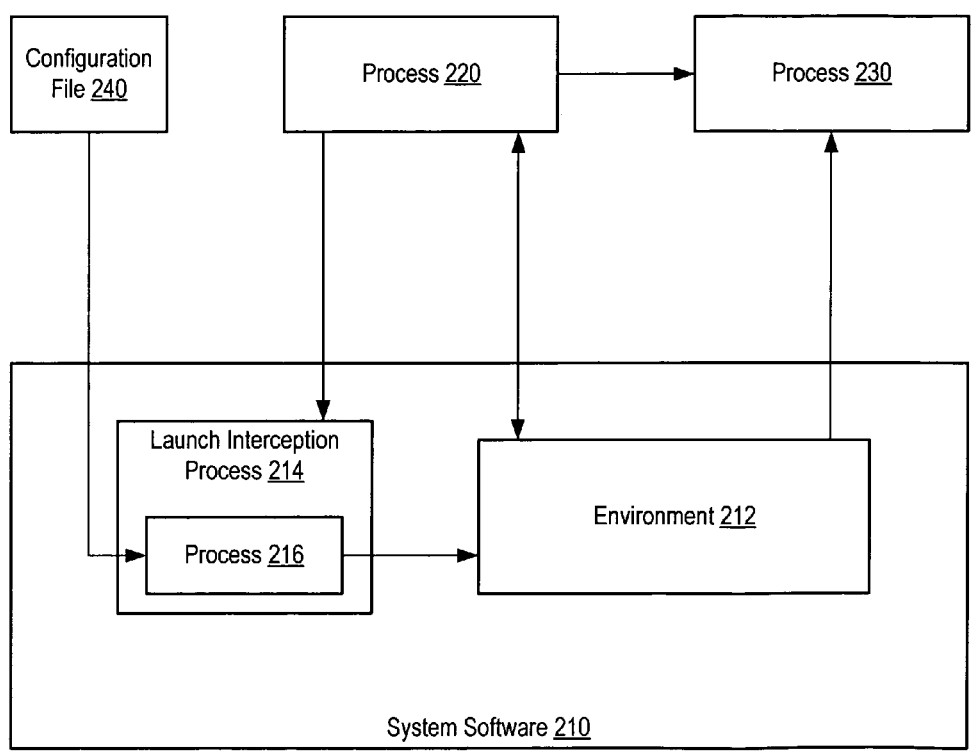
FIG. 2 illustrates one embodiment of components of a software system in which system software may establish an environment in which software processes may operate.

FIG. 2 illustrates one embodiment of components of a software system in which system software 210 may establish an environment 212 in which software processes may operate. In the illustrated embodiment, system software 210 may run on processor 120 along with and in support of a process 220 and a process 230. System software 210 may include a launch interception process 214, which in turn may include a file transfer process 216. Also shown is a configuration file 240 whose function is described below.

During operation, environment 212 may affect the execution of process 220 in a variety of ways. For instance, environment 212 may specify the location of data storage to be used by process 220. Alternatively, or in addition, environment 212 may specify a level of debugging support to be implemented while process 220 is operating. Also, environment 212 may specify whether or not various auxiliary processes may operate in conjunction with process 220. For example, in one embodiment, environment 212 may specify that a profiler may be linked to process 220 as a dynamic link library (DLL), to monitor and gather statistical data related to the use of system resources, exception generation, interaction with other processes, method invocation, performance metrics, or any other profiling data for process 220. In an alternative embodiment, environment 212 may specify that process 230 may be launched in conjunction with the launch of process 220, to profile process 220.

In the embodiment shown in FIG. 2, system software 210 may take a snapshot of the settings of environment 212 that affect the operation of process 220 at the time process 220 is launched. Subsequently, other processes may be launched and other snapshots of environment 212 that are different from those that apply to process 220 may be established. Different processes may have different settings for environment 212 that may be set by a parent process or other high-level software modules such as an application server prior to process launch. In one embodiment, the parent process which sets the values of environment 212 for process 220 is the process which spawns process 220. However, it may be desired to change environment 212 for a given process according to settings that are different from those set by the parent process or other high-level software module. In normal operation, system software 210 may provide a "local" environment for a newly launched process 220 that is inherited from the parent process of process 220. Various difficulties stand in the way of modifying the environment settings for a process after it is launched. For example, if process 220 is a system service, then system software 210 may require a system reboot before new environment settings take effect. However, rebooting a system may be undesirable due to the time involved and the effect on other processes that may be running at the same time. Also, the parent process that establishes the environment settings for process 220 may be part of a third-party application that was not written with the capability of modifying environment settings and whose code is not easily enhanced by the user. Consequently, the parent process of process 220 may not be capable of modifying the environment settings as desired by the user of process 220.

In one embodiment, it may be desired to modify the local environment of a process (e.g., an environment inherited from a parent process) with one or more overriding "global" environment settings. In order to modify the settings of environment 212 for a given process, processor 120 may take advantage of a launch interception process 214 provided by system software 210. In operation, launch interception process 214 may detect a process launch and cause process 216 to retrieve environment settings (e.g., from a configuration file 240). In alternative embodiments, values of environment variables may be retrieved from one of a variety of data repositories other than a configuration file. For example, environment variable values may be retrieved from a system registry, retrieved by querying a remote server, or any other suitable means. In the following discussion, whenever environment settings are described as being retrieved from configuration file 240, it is assumed that each of these alternatives or other alternatives are also possible and are contemplated.

Once the values of the retrieved environment settings have been retrieved, they may be applied to process 220. Having thus established environment 212, the launch may be completed. For example, the local environment associated with the parent process of process 220 may specify that profiling be disabled while global values in configuration file 240 may specify that process 220 is to be profiled and may identify a particular profiler to be used. When process 220 is launched, launch interception process 214 may detect the launch, process 216 may read environment settings for process 220 from configuration file 240 and transfer the settings to environment 212, including a setting specifying that a particular profiling DLL be linked to process 220. Alternatively, the local environment associated with the parent process of process 220 may specify that profiling be enabled while global values in configuration file 240 may specify that profiling be disabled for process 240. In that case, when process 220 is launched, launch interception process 214 may detect the launch, process 216 may read environment settings for process 220 from configuration file 240 and transfer the settings to environment 212, including a setting specifying that profiling be disabled for process 240. In the case of any local and global environment settings that are the same, the functions performed by launch interception process 214 and process 216 may not change those environment settings. System software 210 may, in one embodiment, ensure that the modification of environment 212 by launch interception process 214 is completed before other processes that utilize environment 212 settings become operational.

Separate environment settings may be established for any number of processes in this manner. Any process for which the launch may be intercepted by launch interception process 214 may receive its own environment 212. In one embodiment, configuration file 240 may contain a list of one or more processes identified by name, or some other identifying attribute, along with corresponding environment settings desired for each process in the list. A process for which a name or other identifying attribute is not included in the configuration file 240 may receive certain default settings. For example, process 216 may be configured to apply default settings (which may comprise system-wide default settings) to environment 212 for a process that is omitted from the list of configuration file 240. Alternatively, process 216 may be configured to simply ignore environment settings for a process that is not identified in configuration file 240. In an alternative embodiment, although a given process may be identified in configuration file 240, one or more environment variables may be omitted from the entry corresponding to the given process. In that case, process 216 may be configured to apply default settings to environment 212 or ignore environment settings for the given process, that is, for a process for which a value of an environment variable is not set.

Figure 3:
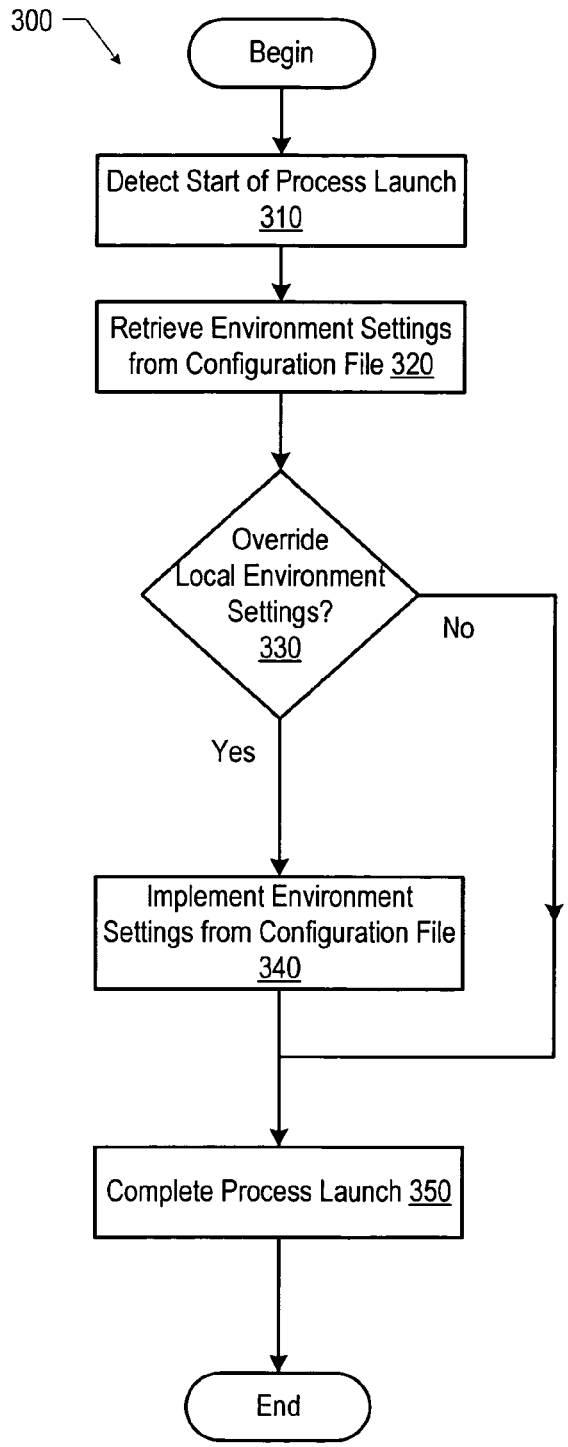
FIG. 3 illustrates one embodiment of a process for managing the environment of a software process.

FIG. 3 illustrates an overview of one embodiment of a process 300 for managing the environment of a software process. Process 300 begins by detecting the start of a process launch (block 310). Upon detecting a process launch, environment settings may be retrieved from a configuration file (block 320). If the retrieved environment settings for the process do not specify that the local environment settings are to be overridden (decision block 330), then the process launch may be completed with no change to the environment settings (block 350). In an alternative embodiment, if an entry corresponding to the process being launched is not present in the configuration file, then environment settings for the process may be cleared or otherwise set to predetermined default values. If the retrieved environment settings for the process specify that the local environment settings are to be overridden (decision block 330), then the retrieved environment settings may be implemented (block 340) prior to completion of the process launch (block 350).

Figure 4:
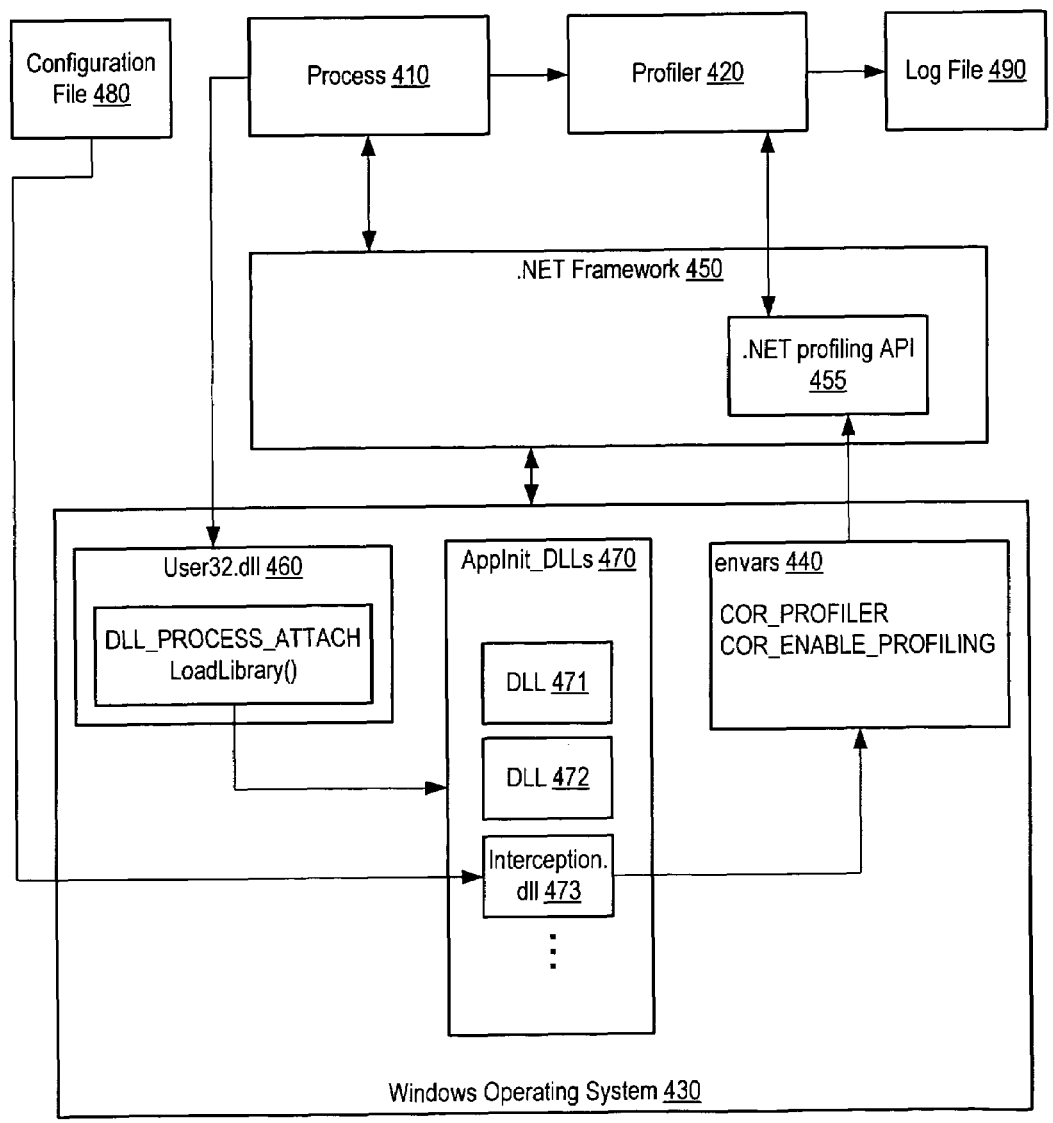
FIG. 4 illustrates one embodiment of components of a software system.

FIG. 4 illustrates one embodiment of components of a software system based on Microsoft Windows and Microsoft .NET in which the environment of a software processes may be managed including profiling of the process. While the Microsoft Windows operating system and .NET framework are utilized for purposes of discussion, the methods and mechanisms described herein may be applied in other environments as well. In the illustrated embodiment, a process 410 and a profiler 420 are shown coupled to a .NET framework 450 supported by a Windows operating system (Windows) 430.

Also shown are a configuration file 480 and a log file 490. Process 410 may be, for example, an active server page (ASP) conforming to the ASP.NET specification. Windows 430 may be one of Windows 98, Windows 2000, Windows XP, or any other version of the Windows operating system with which .NET framework 450 is compatible. In one embodiment, .NET framework 450 includes a .NET profiling application programming interface (API) 455. Profiler 420 may be a DLL written to use the functionality provided by the .NET profiling API 455 and configured to profile process 410.

As further illustrated in FIG. 4, Windows 430 may include environment variables (envars) 440, a User32.dll 460, and a list of AppInit_DLLs 470. Envars 440 are environment variables used by Windows 430 to establish an operating environment for each process that is launched. User32.dll is a dynamic link library that may be linked to user defined processes at the time of launch, such as process 410, that utilize the Windows user interface functionality.

In operation, during the launch of process 410, Windows 430 may assemble various files with process 410 into an executable file or library in a procedure referred to as dynamic linking. Specifically, in one embodiment, Windows 430 may link process 410 to User32.dll 460. As part of the linking procedure for a windows process, User32.dll 460 may execute a process known as DLL_PROCESS_ATTACH that includes execution of a "LoadLibrary( )" function. LoadLibrary may load and initialize DLLs that are listed in AppInit_DLLs 470. Appinit_DLLS 470 may include user specified DLLs 471, 472, 473, etc., that may be dynamically linked to a process during initialization. In the illustrated embodiment, one of the Appinit_DLLs is an interception.dll 473. Interception.dll 473 may be configured to read a set of values for environment variables 440 from configuration file 480 and set the environment variables 440 for process 410 according to these values. Two environment variables in particular may control profiling of process 410. The first, COR_ENABLE_PROFILING, enables or disables profiling of process 410. For example, setting COR_ENABLE_PROFILING may enable profiling and clearing COR_ENABLE_PROFILING may disable profiling. The second, COR_PROFILER, may be used to identify a particular profiler, such as profiler 420, which is to be linked to and used for profiling process 410. Accordingly, interception.dll 473 may retrieve and set values for environment variables COR_ENABLE_PROFILING and COR_PROFILER that apply to process 410 during the launch procedure.

It is noted that changing the value of COR_PROFILER may enable an application to override one profiler with another profiler or select a profiler based on the data collected by another profiler. It is further noted that in various embodiments, selected profiling environment variables may be either set or cleared by default on a system wide basis and then overridden for one or more specific processes via entries in configuration file 480. Once profiling of process 410 has been enabled and the launch of process 410 completed, profiler 420 may store profile data for process 410 in a log file 490.

In one embodiment, interception.dll 473 may consult configuration file 480 during the launch of tens or even hundreds of processes. In order to avoid the delay of reading from non-volatile storage, Windows 430 may maintain a copy of configuration file 480 in memory for faster access.

Figure 5:
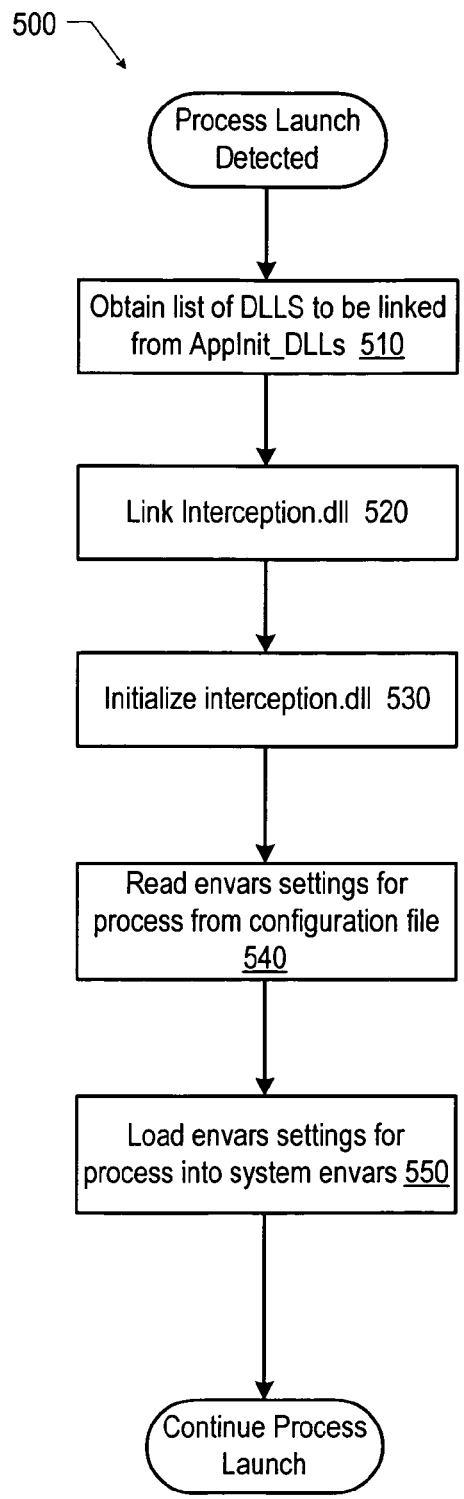
FIG. 5 illustrates one embodiment of a process for loading environment variables from a configuration file for a software process.

FIG. 5 illustrates one embodiment of a process 500 for setting environment variables based on values in a configuration file for a .NET software process. Process 500 begins when a process launch is detected. A list of DLLs to be linked to the process being launched may be obtained from App-init_DLLs (block 510). One of the listed DLLs, interception.dll, may be linked to the launched process (block 520). Subsequently, interception.dll may be initialized (block 530). During initialization, interception.dll may read environment variables settings for the launched process from a configuration file (block 540) and set the environment variables using the retrieved settings (block 550). After the environment variables have been set, the process launch may be continued.

In alternative embodiments, process launch may be intercepted and environment variables set by a variety of mechanisms other than using AppInit_DLLs. For example, any operating system kernel-level interception mechanism such as those used by virus detection software may be used. Alternatively, a higher level process launch interception mechanism may be used.

It is noted that the above described embodiments may comprise software. In such an embodiment, the program instructions which implement the methods and/or mechanisms may be conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A computer system comprising:
   a processor configured to execute one or more processes; and
   at least one process environment comprising one or more environment variables;
   wherein the processor is configured to:
      execute a launch interception process, said launch interception process being configured to automatically detect and intercept launch of processes without user intervention;
      detect launch of a first process using the launch interception process;
      intercept the launch of the first process using the launch interception process;
      access a data repository configured to identify one or more processes, environment variables corresponding to said processes, and values corresponding to each of said environment variables;
      determine whether the data repository includes an entry corresponding to the first process;
      if the data repository does not include an entry corresponding to the first process, set at least one environment variable for the first process to a default value and continue launch of the first process;
      if the data repository does include an entry corresponding to the first process:
         set at least one environment variable identified by the entry to a first value indicated by the entry; and
         continue the launch of the first process.

2. The computer system of claim 1, wherein setting the environment variable enables a profiler.

3. The computer system of claim 2, wherein the processor is configured to:
   enable profiling in response to detecting that the at least one environment variable has a first value; and
   disable profiling in response to detecting that the at least one environment variable has a second value or is not set.

4. The computer system of claim 3, wherein at least one of the environment variables identifies the profiler.

5. The computer system of claim 1, further comprising a data repository,
   wherein the data repository includes one or more entries, each of said entries comprising an identification of a particular process and one or more pre-determined values for environment variables which correspond to the particular process; and
   wherein the processor is configured to retrieve the first value from an entry of the one or more entries that has an identification which corresponds to the first process.

6. The computer system of claim 5, wherein the processor is further configured to set at least one environment variable for the first process to a given value, wherein the given value is chosen irrespective of a value of the at least one environment variable of a parent process of the first process.

7. The computer system of claim 5, wherein the processor is further configured to set at least one environment variable for the first process to a default value, responsive to detecting that the data repository does not contain an entry that has an identification which corresponds to the first process.

8. A computer implemented method for managing the environment of software processes, the method comprising:
   wherein the processor is configured to:
   executing a launch interception process, said launch interception process being configured to automatically detect and intercept launch of processes without user intervention;
   detecting launch of a first process using the launch interception process;
   intercepting the launch of the first process;
   accessing a data repository configured to identify one or more processes, environment variables corresponding to said processes, and values corresponding to each of said environment variables;
   determining whether the data repository includes an entry corresponding to the first process;
   if the data repository does not include an entry corresponding to the first process, setting at least one environment variable for the first process to a default value and continuing launch of the first process;
   if the data repository does include an entry corresponding to the first process:
      setting at least one environment variable identified by the entry to a first value; and
      continuing the launch of the first process.

9. The method of claim 8, wherein the environment variable is used for enabling profiling of the first process.

10. The method of claim 9, further comprising:
enabling profiling of the first process in response to detecting that the at least one environment variable has a first value; and
disabling profiling of the first process in response to detecting that the at least one environment variable has a second value or is not set.

11. The method of claim 10, wherein at least one of the environment variables identifies the profiler.

12. The method of claim 8, further comprising retrieving the first value from a data repository that includes one or more entries, each of said entries comprising an identification of a particular process and one or more pre-determined values for environment variables which correspond to the particular process;
wherein the first value is retrieved from an entry of the one or more entries that has an identification which corresponds to the first process.

13. The method of claim 12, further comprising setting at least one environment variable for the first process to a given value, wherein the given value is chosen irrespective of a value of the at least one environment variable of a parent process of the first process.

14. The method of claim 12, further comprising setting at least one environment variable for the first process to a default value, responsive to detecting that the data repository does not contain an entry that has an identification which corresponds to the first process.

15. A computer readable medium storing computer instructions for managing the environment of software processes, wherein the instructions are executable by a processor to:
execute a launch interception process, said launch interception process being configured to automatically detect and intercept launch of processes without user intervention;
detect launch of a first process using the launch interception process;
intercept the launch of the first process using the launch interception process;
access a data repository configured to identify one or more processes, environment variables corresponding to said processes, and values corresponding to each of said environment variables;
determine whether the data repository includes an entry corresponding to the first process;
if the data repository does not include an entry corresponding to the first process, set at least one environment variable for the first process to a default value and continue launch of the first process;
if the data repository does include an entry corresponding to the first process:
set at least one environment variable identified by the entry to a first value indicated by the entry; and
continue the launch of the first process.

16. The computer readable medium of claim 15, wherein the environment variable is used for enabling profiling of the first process.

17. The computer readable medium of claim 16, wherein the instructions are further executable to:
enable profiling of the first process in response to detecting that the at least one environment variable has a first value; and
disable profiling of the first process in response to detecting that the at least one environment variable has a second value or is not set.

18. The computer readable medium of claim 17, wherein at least one of the environment variables identifies the profiler.

19. The computer readable medium of claim 15,
wherein the instructions are further executable to retrieve the first value from a data repository that includes one or more entries, each of said entries comprising an identification of a particular process and one or more pre-determined values for environment variables which correspond to the particular process;
wherein the first value is retrieved from an entry of the one or more entries that has an identification which corresponds to the first process.

20. The computer readable medium of claim 19, wherein the instructions are further executable to set at least one environment variable for the first process to a given value, wherein the given value is chosen irrespective of a value of the at least one environment variable of a parent process of the first process.

21. The computer readable medium of claim 19, wherein the instructions are further executable to set at least one environment variable for the first process to a default value, responsive to detecting that the data repository does not contain an entry that has an identification which corresponds to the first process.

22. The system of claim 1, wherein said data repository comprises a configuration file configured to identify a plurality of processes and corresponding environment variables.

* * * * *